United States Patent [19]

Ueno et al.

[11] Patent Number: 4,575,184
[45] Date of Patent: Mar. 11, 1986

[54] FLAME RETARDANT OPTICAL COMPOSITE CABLE

[75] Inventors: Keiji Ueno, Osaka; Akinori Mori, Tochigi, both of Japan

[73] Assignee: Sumitomo Electric Industries, Ltd., Osaka, Japan

[21] Appl. No.: 564,648

[22] Filed: Dec. 22, 1983

[30] Foreign Application Priority Data

Jun. 6, 1983 [JP] Japan ............................ 58-101240

[51] Int. Cl.⁴ .................................................. G02B 5/16
[52] U.S. Cl. ............................... 350/96.23; 174/70 R; 174/110 SR; 106/18.11; 252/609
[58] Field of Search ............. 350/96.23; 174/110 SR, 174/110 FC, 70 R; 106/18.11, 18.26, 18.27, 18.36; 252/601, 602, 609, 610, 611

[56] References Cited

U.S. PATENT DOCUMENTS

| | | | |
|---|---|---|---|
| 4,182,799 | 1/1980 | Rodish | 252/601 X |
| 4,272,155 | 6/1981 | Slaughter | 350/96.23 |
| 4,394,471 | 7/1983 | Keogh | 174/110 SR X |
| 4,430,470 | 2/1984 | Taniguchi et al. | 174/110 SR X |
| 4,447,122 | 5/1984 | Sutehall | 350/96.23 |

FOREIGN PATENT DOCUMENTS

| | | | |
|---|---|---|---|
| 3204667 | 8/1983 | Fed. Rep. of Germany | 350/96.23 |
| 56-114902 | 9/1981 | Japan | 350/96.23 |

*Primary Examiner*—John Lee
*Attorney, Agent, or Firm*—Sughrue, Mion, Zinn, Macpeak and Seas

[57] ABSTRACT

An optical composite cable having an outer sheath comprising a radiation cured copolymer of ethylene and vinyl acetate containing 50–85% by weight of vinyl acetate having intimately admixed therewith a flame retarding and smoke suppressing amount of a finely divided filler mixture consisting essentially of a first filler selected from hydroxides and carbonates of di- and tri-valent metals and a second filler which is zinc borate.

10 Claims, 1 Drawing Figure

4,575,184

FLAME RETARDANT OPTICAL COMPOSITE CABLE

BACKGROUND OF THE INVENTION

The present invention relates to an optical composite cable which is highly flame retardant, smoke suppressed upon flaming and exhibits a reduced increase in the transmission loss.

Recently, electronic instruments such as computers and fascimiles have come into wide use. As the amount of information to be transmitted increases, the use of composite optical cable in which normal insulated electric wires of a metallic conductor and optical transmission lines of an optical fiber excellent in transmission efficiency, is growing. Wirings for the instruments are made in buildings and offices, and thus required to be flame retardant and smoke suppressed upon flaming from a view point of a prevention of calamities. Insulating materials for such wires and cables should desirably be highly flame retardant and smoke suppressed. Fluorine resins are generally used for this purpose.

With a cable of normal insulated electric wires enveloped within an outermost sheath of a fluorine resin, no problems are posed. It has been found, however, that the fluorine resin, when used as an outermost sheath of an optical composite cable having insulated electric wires and optical transmission lines enveloped within the outermost sheath, undesirably increases the transmission loss of the optical transmission lines. A particular problem relating to such optical transmission lines concerns the transmission loss, which is usually within the range between about 2 and 3 dB/Km. However, with the optical composite cable having an outermost sheath of a fluorine resin, the transmission loss of the line amounts to 1.5 to 2 times that of the optical transmission line alone. This means a reduction of the effective cable length by ½ to ⅔ and is a serious problem in the cable system connecting instruments.

SUMMARY OF THE INVENTION

An object of the invention is to provide an optical composite cable having an outermost sheath, which is satisfactorily flame retardant and smoke suppressed and which does not substantially increase the transmission loss of optical transmission lines enveloped therein.

The invention is based on a discovery that a certain flame retardant and smoke suppressed polymeric composition does not substantially increase the transmission loss of optical transmission lines, even when used as a material for the outermost sheath of the optical composite cable.

Thus, the invention provides an optical composite cable comprising (1) at least one insulated electric wire which comprises a core of a metallic conductor and an insulating coating of a fluorine resin, (2) at least one optical transmission line which comprises a buffered core of an optical fiber and a coating of a fluorine resin and (3) an outer sheath which envelops all the electric wire and optical transmission line, wherein said outer sheath comprises:

a radiation cured copolymer of ethylene and vinyl acetate containing 50 to 85% by weight of polymerized units derived from vinyl acetate; and a flame retarding and smoke suppressing amount of a finely divided filler mixture intimately admixed with said copolymer, said filler mixture consisting essentially of a first filler selected from the group consisting of hydroxides and carbonates of di- and tri-valent metals and a second filler which is zinc borate, the ratio by weight of said second filler to the filler mixture being within the range between 0.25 to 0.75.

DETAILED DESCRIPTION OF THE INVENTION

Figure 1:
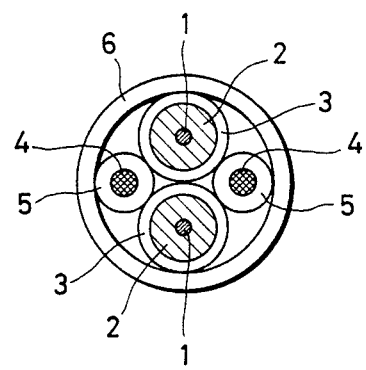
FIG. 1 is a view schematically showing a cross-section of an optical composite cable in accordance with one embodiment of the invention.

Examples of the first filler include, for example, aluminum hydroxide, magnesium hydroxide, calcium hydroxide, barium hydroxide, magnesium carbonate, magnesium calcium carbonate, calcium carbonate, zinc carbonate and barium carbonate.

Examples of the fluorine resin include, e.g., polymers and copolymers of perfluoroalkylenes such as polytetrafluoroethylene, polyhexafluoropropylene and copolymers of tetrafluoroethylene and hexafluoropropylene as well as polymers of vinyl fluoride such as polyvinyl fluoride.

The amount of smoke upon flaming of a polymeric material can be estimated in terms of the maximum smoke density (Dm) upon flaming of the material, which may be determined using a suitable equipment known as NBS smoke density chamber. Regarding fluorine resins, fluoroethylene polymers have a Dm of 25 to 50, while vinyl fluoride polymers have a Dm of 110 to 120. The flame retardancy of a polymeric material may be estimated by the oxygen index (OI) which may be determined, for example, by the procedure prescribed in JIS-K-7201 (Japanese Industrial Standard). In order that a polymeric material can be rated as being flame retardant upon vertical burning tests it should have an OI as high as 27 to 30 or higher. Preferred optical composite cable in accordance with the invention have an outer sheath whose Dm is 100 or below and whose OI is 30 or higher.

By the term "an optical composite cable" used herein is meant an optical cable wherein at least one optical transmission line is enveloped with an outer sheath together with at least one insulated electric wire.

By the term "a base polymeric material" used herein is meant a polymeric material, of which the flame retardant and smoke suppressed polymeric composition is prepared by intimately admixing therewith the specified filler mixture. Preferably, the base polymeric material essentially consists of a radiation curable copolymer of ethylene and vinyl acetate containing 50 to 85% by weight of polymerized units derived from vinyl acetate. However, depending upon the desired properties of the final products the base polymeric material may be a blend of such a copolymer and up to about 50% by weight, based on the blend, of one or more other polymers. Examples of such other polymers include, for example, polyethylene, polypropylene, a copolymer of ethylene and vinyl acetate containing less than 50% by weight of vinyl acetate, a copolymer of ethylene and ethyl acrylate, a copolymer of ethylene and α-olefin, EP rubber, butyl rubber, polybutadiene and polyurethane.

By the term "a flame retarding and smoke suppressing amount of a filler mixture" used herein is meant an amount of the filler mixture required to achieve a desired level of flame retardancy and at the same time a desired level of suppressed smoking. More particularly, it means an amount of the mixture admixed with a base polymeric material to provide a polymeric composition having concurrently a desired level of flame retardancy and a desired level of suppressed smoking. Generally at least 100 parts by weight of the filler mixture based on 100 parts by weight of the base polymeric material is required to obtain satisfactory results. A desirable polymeric composition both before and after radiation curing has an oxygen index of 30 or higher and a maximum smoke density of 100 or below. The upper limit of the filler mixture admixed with the base polymeric material is not strictly critical. But it should be noted that addition of an excessive amount of the filler mixture adversely affect mechanical properties and processability of the composition, and therefore addition of the filler mixture in excess of about 300 parts by weight based on 100 parts by weight of the base polymeric material should be normally avoided. In this connection, a base polymeric material consisting essentially of a copolymer of ethylene and vinyl acetate containing 50-85% by weight of polymerized units derived from vinyl acetate is advantageous in that it can be heavily loaded with the filler mixture, if desired, without its mechanical properties after curing and processability intolerably deteriorated.

Mechanical properties of the base polymeric material which have been reduced by the addition of the filler mixture can be improved by subjecting the composition to radiation curing normally after shaping. For example, a copolymer of ethylene and vinyl acetate containing about 60% by weight of vinyl acetate and having a molecular weight of about 200,000, as admixed with the same weight of a finely divided inorganic filler (aluminum hydroxide), has a tensile strength as low as 0.1 kg/mm$^2$, and is of no practical use. However, when such a composition is irradiated with 20M rad of electron beams, the tensile strength reaches 0.6 kg/mm$^2$, the level normally possessed by vulcanized rubbers, rendering the product practically useful.

It should also be pointed out that radiation curing ensures effective shaping and crosslinking of the material. This is not the case with the chemical curing by means of an organic peroxide. Because of a high torque in the filled material being shaped, a temperature of the material being shaped necessarily reaches about 200° C., which exceeds the decomposition temperature (normally 120° to 180° C.) of organic peroxides. Accordingly, when the material contains an organic peroxide, crosslinking takes place within the shaping machine, so that the material may not be suitably shaped.

The filler mixture consists essentially of a first filler selected from the group consisting of hydroxides and carbonates of di- and tri-valent metals and a second filler which is zinc borate. For the purpose of the invention, the ratio by weight of the second filler to the filler mixture must be within the range between 0.25 to 0.75. If this ratio is substantially higher than 0.75, an intolerably large amount of the filler mixture is required to achieve a desirably high oxygen index. Likewise, if this ratio is substantially lower than 0.25, an unacceptably large amount of the filler mixture is required to achieve a desirably low maximum smoke density.

Optionally, the polymeric composition may contain other additives, including, for example, antioxidants, lubricants, slipping agents, pigments and halogen containing flame retardants, in an amount of up to about 10 parts by weight based on 100 parts by weight of the base polymeric material.

With reference to FIG. 1, an optical composite cable according to the invention comprises at least one optical transmission line comprising a core of an optical fiber 1 buffered with a buffering material 2, such as a silicone oil and a coating 3 of a fluorine resin; at least one insulated electric wire comprising a core of a metallic conductor 4 and an insulating coating 5 of fluorine resin; and an outer sheath 6 enveloping all the wire and line. Such a structure of the optical composite cable in itself is well-known in the art. The optical composite cable according to the invention may be prepared by extruding the polymeric composition disclosed herein so as to form a sheath around a bundle of the insulated electric wires and optical transmission lines, and radiation curing the so formed sheath.

REFERENCE EXAMPLE 1

A finely divided filler mixture consisting essentially of 100 parts by weight of aluminium hydroxide and 100 parts by weight of zinc borate was prepared. A copolymer of ethylene and vinyl acetate having a molecular weight of about 200,000 and containing about 60% by weight of vinyl acetate was intimately admixed with the filler mixture in varied amounts indicated in Table 1 to provide various polymeric composition.

A copper wire having a diameter of 0.8 mm was coated with each polymeric composition to provide a coated wire having an outer diameter of 2.4 mm, which was then irradiated with 20M rad of electron beams. A sheath of each electric wire so prepared was tested for its maximum density upon flaming, oxygen index and tensile strength. Results are shown in Table 1.

TABLE 1

| | Polymeric Composition | | | | |
|---|---|---|---|---|---|
| | Copolymer (parts by weight) | Filler Mixture (Parts by weight) | Maximum Smoke Density | Oxygen Index | Tensile Strength (kg/mm$^2$) |
| 1 | 100 | 100 | 90 | 30 | 0.61 |
| 2 | 100 | 150 | 75 | 32 | 0.66 |
| 3 | 100 | 200 | 75 | 35 | 0.65 |
| 4 | 100 | 250 | 60 | 55 | 0.79 |

It is revealed from Table 1 that when the filler mixture (1:1 aluminum hydroxide and zinc borate) is used, a preferred composition and sheath having a maximum smoke density of 100 or below and an oxygen index of 30 or higher can be obtained with less than 250 parts by weight of the filler per 100 parts by weight of the copolymer.

A similar series of experiments, in which aluminum hydroxide alone was used instead of the filler mixture, showed that at least 250 parts by weight of the aluminum hydroxide per 100 parts by weight of the copolymer was reuired to simultaneously achieve a maximum smoke density of 100 or below and an oxygen index of 30 or higher. Another series of the experiments wherein zinc borate was used as a sole flame retardant revealed that a maximum smoke density of 100 or below and an oxygen index of 30 or higher could be simultaneously achieved only when the zinc borate was used in an amount of about 300 parts by weight or more based on 100 parts by weight of the copolymer.

REFERENCE EXAMPLE 2

The preparation and test procedures of Reference Example 1 were repeated except that a 1:1 (by weight) mixture of magnesium carbonate and zinc borate was used instead of the filler mixture of Reference Example 1. Results are shown in Table 2.

TABLE 2

| | Polymeric Composition | | | | |
| --- | --- | --- | --- | --- | --- |
| | Copolymer (parts by weight) | Filler Mixture (Parts by weight) | Maximum Smoke Density | Oxygen Index | Tensile Strength (kg/mm$^2$) |
| 1 | 100 | 100 | 88 | 31 | 0.59 |
| 2 | 100 | 150 | 73 | 34 | 0.63 |
| 3 | 100 | 200 | 55 | 36 | 0.63 |
| 4 | 100 | 250 | 50 | 60 | 0.66 |

Table 2 reveals that when the filler mixture (1:1 magnesium carbonate and zinc borate) is used, a preferred composition and sheath having a maximum density of 100 or below and an oxygen index of 30 or higher can be obtained with less than 250 parts by weight of the filler mixture per 100 parts by weight of the copolymer.

EXAMPLE 1

Optical composite cables of a structure as shown in FIG. 1 were prepared and tested for the transmission loss. The optical transmission line comprised a core of optical fiber 1 having a diameter of 125µ coated with a buffer 2 and FEP 3, and had an outside diameter of 2.8 mm. The transmission loss of this optical transmission line alone was 3.1 dB/Km. The insulated electric wire comprised a bundle of twisted tin-plated copper wires (AWG 22) 4 coated with an FEP insulation 5, and had an outside diameter of 1.9 mm. A bundle of two lengths of the optical transmission line and two lengths of the insulated electric wire was extrusion coated with each of the compositions 3 indicated in Tables 1 and 2 to prepare an optical composite cable having an outer diameter of 7.2 mm, the thickness of the outer sheath being 0.8 mm. The composite cables so prepared exhibited a transmission loss of 3.0 to 3.2 dB/Km which was substantially the same as that of the optical transmission line alone.

For a comparison purpose, a control composite cable of the same structure was prepared except that the outer sheath was formed from FEP, and determined for the transmission loss. The control product exhibited a transmission loss of 4.2 dB/Km.

Thus, the optical composite cable in accordance with the invention having an outer sheath formed from the specified flame retardant and smoke suppressed polymeric composition has proved to be unexpectedly advantageous over the comparable known products having an outer sheath of fluorine resins in that the product of the invention does not suffer from any substantial increase of the transmission loss of the optical transmission line.

While the invention has been described in detail and with reference to specific embodiments thereof, it will be apparent to one skilled in the art that various changes and modifications can be made therein without departing from the spirit and scope thereof.

What is claimed is:

1. An optical composite cable comprising (1) at least one insulated electric wire which comprises a core of a metallic conductor and an insulating coating of a fluorine resin, (2) at least one optical transmission line which comprises a buffered core of an optical fiber and a coating of a fluorine resin and (3) an outer sheath which envelops all the electric wires and optical transmission lines, wherein said outer sheath comprises:

a radiation cured copolymer of ethylene and vinyl acetate containing 50 to 85% by weight of polymerized units derived from vinyl acetate; and a flame retarding and smoke suppressing amount of a finely divided filler mixture intimately admixed with said copolymer, said filler mixture consisting essentially of a first filler selected from the group consisting of hydroxides and carbonates and di- and tri-valent metals and a second filler which is zinc borate, the ratio by weight of said second filler to the filler mixture being within the range between 0.25 to 0.75.

2. The optical composite cable according to claim 1, wherein said first filler is aluminum hydroxide.

3. The optical composite cable according to claim 1, wherein said first filler is magnesium hydroxide.

4. The optical composite cable according to claim 1, wherein said first filler is calcium hydroxide.

5. The optical composite cable according to claim 1, wherein said first filler is barium hydroxide.

6. The optical composite cable according to claim 1, wherein said first filler is magnesium carbonate.

7. The optical composite cable according to claim 1, wherein said first filler is magnesium calcium carbonate.

8. The optical composite cable according to claim 1, wherein said first filler is calcium carbonate.

9. The optical composite cable according to claim 1, wherein said first filler is zinc carbonate.

10. The optical composite cable according to claim 1, wherein said first filler is barium carbonate.

* * * * *